June 11, 1968     F. E. WEIRAUCH     3,387,389
EDUCATIONAL VISUAL AID
Filed Jan. 26, 1966
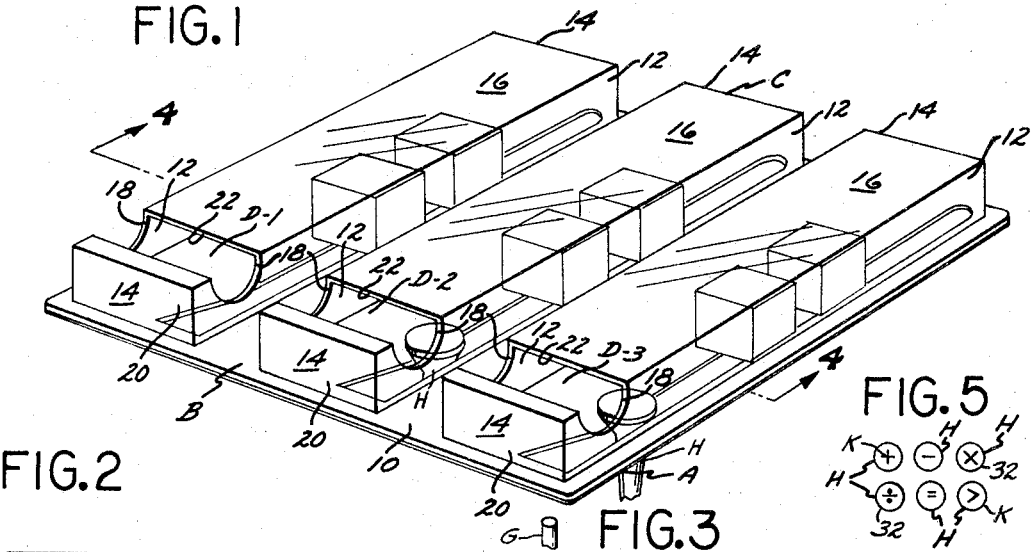
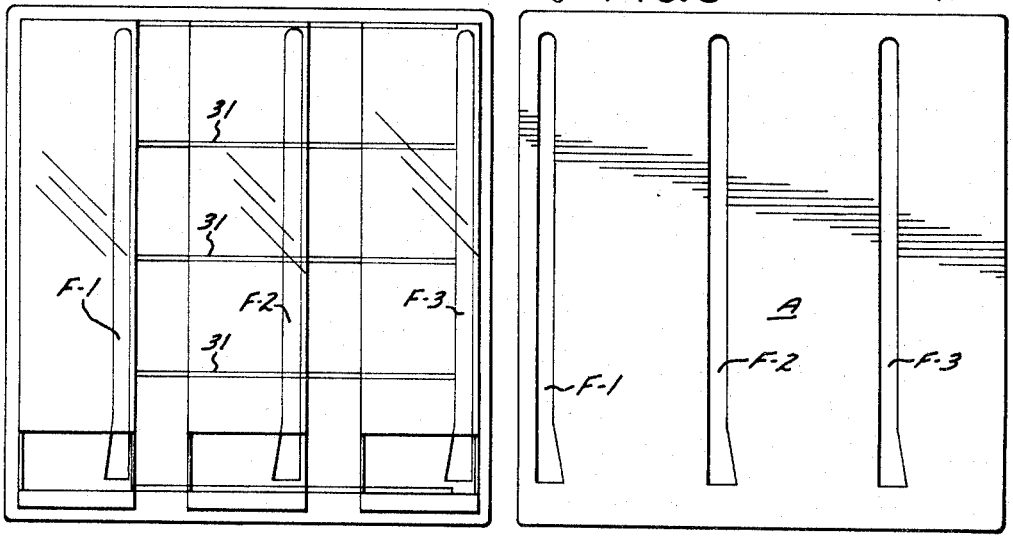
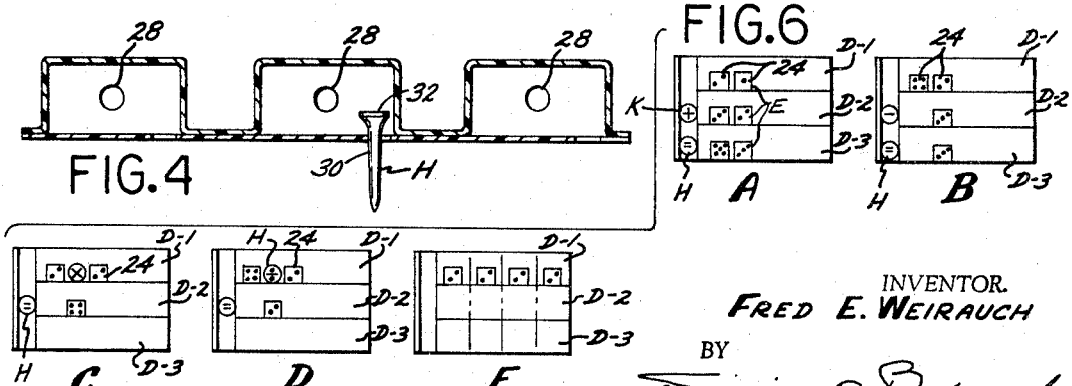
INVENTOR.
FRED E. WEIRAUCH
BY
ATTORNEY United States Patent Office 3,387,389
Patented June 11, 1968

1

3,387,389
EDUCATIONAL VISUAL AID
Fred E. Weirauch, Marysville, Calif.
(1242 21st Ave., Apt. 2, Longview, Wash. 98632)
Filed Jan. 26, 1966, Ser. No. 523,096
5 Claims. (Cl. 35—31)

ABSTRACT OF THE DISCLOSURE

An educational visual aid which comprises a flat, rigid base with a plurality of slots therein. A transparent rigid hollow structure is bonded to one side of the base to form a plurality of elongated confined spaces, each of the spaces being in communication with one of the slots. A plurality of insignia-bearing cubes or similar bodies are confined within the spaces and means that are extensible through the slots are provided for manipulating the bodies to demonstrate various mathematical relationships.

During the past few years, instruction of elementary mathematics in many national educational systems has been drastically altered, and popularly known as "Modern Mathematics." In the main, this new method of instruction has been based on the visual demonstration of why certain mathematical relationships exist, rather than requiring the student to blindly memorize various intangible rules.

In the application of modern mathematics, which is "new" only as to concept, a child may be given a number of sticks of preedetermined length and color, and shown that the total length thereof adds up or is equal to the length of another stick of another color, which is the total length of the combined shorter sticks. In this manner children are able to quickly and visually comprehend the principles of addition, subtraction, division and multiplication. In physically handling groups of objects and examining tables and diagrams to determine patterns therein, the natural curiosity of a child is aroused, whereby he acquires a more basic and clear-cut understanding of mathematics than that attainable by memorizing tables, rules and intangible relationships.

A primary object of the present invention is to provide a modern mathematics visual aid that is compact, self-contained, simple in structure, easy to use, and one by which a student may more quickly learn the basic principles of mathematics by physicaly manipulating one or more tangible objects to dispose the same in a particular relationship that is visually comprehended.

Another object of the present invention is to furnish a visual aid device embodying a number of groups of objects which are movably contained within predetermined limits, with the objects in each group being susceptible of individual manipulation to establish different mathematical relationships between the objects in that group and those in another group or groups.

A still further object of the invention is to provide a visual aid device embodying a number of objects such as cubes or the like, on the faces of which varying insignias are imprinted which can be used in conjunction with symbol-bearing rods to visually demonstrate the concept of addition, substraction, multiplication, division or fractional parts, together with the theory of sets and other mathematical relationships.

Yet another object of the invention is to provide an educational visual aid for teaching modern mathematics that is inexpensive, can be produced from standard, commercially available materials, and retailed at a sufficiently low price to encourage the widespread use thereof.

These and other objects and advantages of the invention will become apparent from the following description thereof, and from the accompanying drawing illustrating the same, in which:

FIGURE 1 is a perspective view of the visual aid of the present invention;

FIGURE 2 is a top plan view of the device shown in FIGURE 1;

FIGURE 3 is a bottom plan view of the visual aid shown in FIGURE 1;

FIGURE 4 is a transverse cross-sectional view of the device shown in FIGURE 1, taken on the line 4—4 thereof;

FIGURE 5 is a top plan view of a number of symbol-bearing members, each of which carries a different mathematical symbol; and FIGURES 6a, 6b, 6c, 6d and 6e are diagrammatic views of the devices shown in FIGURE 1, illustrating the manner in which the same can be used to indicate visually to a child the concept of addition, subtraction, multiplication, division and fractional parts.

With continued reference to the drawing for the general arrangement of the invention, it will be seen in FIGURE 1 to include a flat base A having a transparent upper structure B bonded thereto, which base and structure cooperate to form three elongate confined spaces D–1, D–2 and D–3.

The flat base A is preferably formed from a lightweight, rigid, opaque sheet material, and the structure B includes a flat, rigid sheet 10 of the same size as the base that is bonded thereto by conventional means, such as glue, or the like. Three pairs of spaced side walls 12 and connecting end walls 14 extend upwardly from sheet 10. Three rectangular top walls 16 are disposed above and parallel to base A, and these top walls connect adjacent pairs of side walls 12 and end walls 14, as best shown in FIGURE 1.

Each pair of associated side walls 12, end walls 14 and top walls 16 cooperate with base A to define one of the confined spaces D–1, D–2 and D–3. Each pair of side walls 12 has transversely aligned recesses 18 extending downwardly from the upper portions thereof in a first end section 20 that are in communication with elongate openings 22 formed in the top walls 16 associated with that particular pair of side walls.

A number of symbol-bearing members H are provided, each of which includes an elongate shank 30 having an enlarged head 32 on one end thereof. A different mathematical symbol K is imprinted on the upper surface of the head 32 of each member H. The shank 30 is of such transverse cross section as to extend downwardly through one of three slots F–1, F–2 or F–3 formed in base A, as can best be seen in FIGURE 2. Each head 32 is of sufficiently large cross section as to be supported by the portions of the base A on each side of one of the slots F1–, F–2, or F–3.

Three longitudinally spaced, transversely extending lines 31 are preferably imprinted on the upper surface of base A (FIGURE 2), which are visible through the transparent upper structure B. The purpose of lines 31 will be explained hereinafter.

A number of rigid cubes E are provided, or other multifaced bodies such as dice, which serve very well for this purpose, on the faces of which different insignia 24 are imprinted. The cubes E are of such size as to be insertable through the openings 22 into the confined spaces D–1, D–2 or D–3, or removed therefrom through these openings. The recesses 18 and openings 22 permit the cubes E to be grasped easily by the forefinger and thumb (not shown) when the cubes are in end portions of the confined spaces D–1, D–2 and D–3.

The three elongate slots F–1, F–2 and F–3 in base

A (FIGURE 2) communicate with the confined spaces D-1, D-2 and D-3 respectively. An elongate rod G is provided that is of such transverse cross section as to be slidably movable in each one of the slots F-1, F-2 or F-3, and is used to manipulate the cubes E when disposed in one of the spaces D-1, D-2 or D-3. The confined spaces D-1, D-2 and D-3 are of such size as to accommodate a substantial number of cubes E when disposed in rows, and preferably are of such width as to permit columns of at least two of these cubes to be disposed therein.

The symbol-bearing members H may be conventional golf tees if desired, and various mathematical symbols 25 of the type shown in FIGURE 5 are inscribed on the top surfaces thereof. The symbols K will include those used conventionally for addition, subtraction, multiplication, divisions, equals, and an angular symbol indicating greater than or less than, depending on the direction in which the latter symbol points. The insignia 24 imprinted on the cubes E may be in the form of dots, such as when dice are used for the cubes, as well as other conventional forms with which a child is familiar, which could be such conventional forms as stars, dogs, cats, umbrellas, or the like.

For the sake of simplicity in describing the use of the invention, dice are used for the cubes E in the manner shown in the drawing. Examples thereof are shown in FIGURES 6(a) through 6(e).

In FIGURES 6(a) the use of the visual aid in illustrating the concept of addition is shown. Two cubes E bearing insignia units 24 in the form of one and two dots are disposed in confined space D-1 in columnar areas defined by the lines 31. Two second cubes E bearing insignia units 24 in the form of three dots and two dots are placed in transverse alignment with the first column of cubes in confined space D-1. A symbol-bearing member H carrying a symbol W which indicates addition is then selected and placed in the left-hand end of slot F-2, as shown in FIGURE 6(a).

Two third cubes E are thereafter selected and positioned in confined spaced D-3 in transverse alignment with the first and second cubes E. The cubes E must be so oriented that the uppermost faces thereof carry insignia 24 thereon that equal to the sums of the insignia units imprinted on the first and second cubes E in confined spaces D-1 and D-2. Thus, the device shown in FIGURE 6(a) indicates visually that 1 plus 2 equals 3, and 2 plus 3 equals 5. Also, the device shown in FIGURE 6(a) illustrates visually that 3 plus 5 equals 8.

To familiarize a child with the mathematical equal sign =, a symbol-bearing member H on which this indicia K is imprinted, is disposed in the left-hand end of slot F-3, as illustrated in FIGURE 6(a). Similarly, a vidsual concept of subtraction may be shown by using the device in the manner illustrated in the same figure. When subtraction is the subject being taught, a symbol-bearing member H carrying the subtraction symbol K is employed in lieu of the member H bearing the additional symbol K thereon.

The visual concept of multiplication is illustrated in FIGURE 6(c) by use of cubes E in confined spaces D-1 and D-2, and by placing symbol-bearing members H carrying the appropriate multiplication and equal symbols in proper positions relative thereto.

Visual concept of division is shown in FIGURE 6(d) which involves similarly positioning the cubes E in the positions occupied in FIGURE 6(c), but with a symbol-bearing member H being employed that carries the "division" symbol K.

Cubes E are disposed in confined spaces D-1 and D-2 between lines 31, as shown in FIGURE 6(e), to illustrate fractional parts, and to visually demonstrate that 4/4 equals 8/8.

The elongate rod G is preferably included as a part of the visual aid, and is adapted to be extended upwardly through the slots F-1, F-2 and F-3 to move cubes E in confined spaces D-1, D-2 and D-3. Also if desired, the rod G can be slid through openings 28 formed in end walls 14 to accomplish the same result. Should it be desired, the base A can be formed to include a longitudinally extending pocket (not shown) thereunder in which accessories that may be used in conjunction therewith may be stored. The upper structure B is preferably molded as an integral unit from a clear transparent polymerized resin.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:

1. An education visual aid for removably supporting a plurality of multi-faced insignia-bearing bodies in positions which demonstrate a mathematical relationship therebetween, including:
    (a) a flat, rigid base in which a plurality of spaced parallel slots are formed;
    (b) a transparent rigid hollow structure bonded to one side of said base, which structure cooperates with said base to define a plurality of elongate confined spaces, with each of said spaces being in communication with one of said slots;
    (c) first means for inserting said bodies in and removing said bodies from said confined spaces; and
    (d) second means that extend through said slots for manipulating said bodies when in said confined spaces to demonstrate a mathematical relationship.

2. An educational visual aid as defined in claim 1 which further includes:
    (e) third means removably supported in at least one of said slots for indicating a particular mathematical operation, which operation when performed on the insignias of said bodies in at least one of said confined spaces, will yield the results shown by the insignias on said bodies in another of said confined spaces.

3. An educational visual aid as defined in claim 1 wherein said structure includes a plurality of top walls and pairs of side walls and end walls which cooperate with said base to define said confined spaces, and said first means comprise transversely aligned recesses that extend downwardly in said pairs of side walls and are in communication with transverse openings in said top walls, with said openings being of sufficient width as to permit said bodies to be moved into and out of said confined spaces.

4. An education visual aid as defined in claim 3 wherein openings are formed in at least a portion of said end walls, and said second means comprise rods that can be slidably inserted through said openings to manipulate said bodies in said confined spaces in communication with said openings.

5. An educational visual aid as defined in claim 2 wherein each of said third means includes:
    (e) an elongate shank of such transverse cross section as to extend downwardly through one of said slots;
    (f) a head on one end of said shank that is of greater diameter than the width of said slots; and
    (g) a mathematics operation symbol on the upper surface of said head.

References Cited
UNITED STATES PATENTS

| | | | |
|---|---|---|---|
| 2,639,153 | 5/1953 | Murray | 273—145.3 |
| 3,267,590 | 8/1966 | Browning | 35—31.6 |
| 3,204,345 | 9/1965 | Buckner | 35—31.2 |

EUGENE R. CAPOZIO, *Primary Examiner.*

WILLIAM H. GRIEB, *Examiner.*